Aug. 11, 1964 D. H. RUMBLE 3,144,609

SIGNAL TO NOISE ENHANCEMENT TECHNIQUE FOR BINARY TRANSMISSION

Filed Dec. 30, 1960 2 Sheets-Sheet 1

INVENTOR.
D. H. RUMBLE

BY Sughrue, Rothwell, Mion & Zinn

ATTORNEYS

United States Patent Office 3,144,609 Patented Aug. 11, 1964

3,144,609
SIGNAL TO NOISE ENHANCEMENT TECHNIQUE FOR BINARY TRANSMISSION

Dale H. Rumble, Carmel, N.Y., assignor to International Business Machines Corporation, New York, N.Y., a corporation of New York Filed Dec. 30, 1960, Ser. No. 79,780
18 Claims. (Cl. 325—38)

Figure 1:
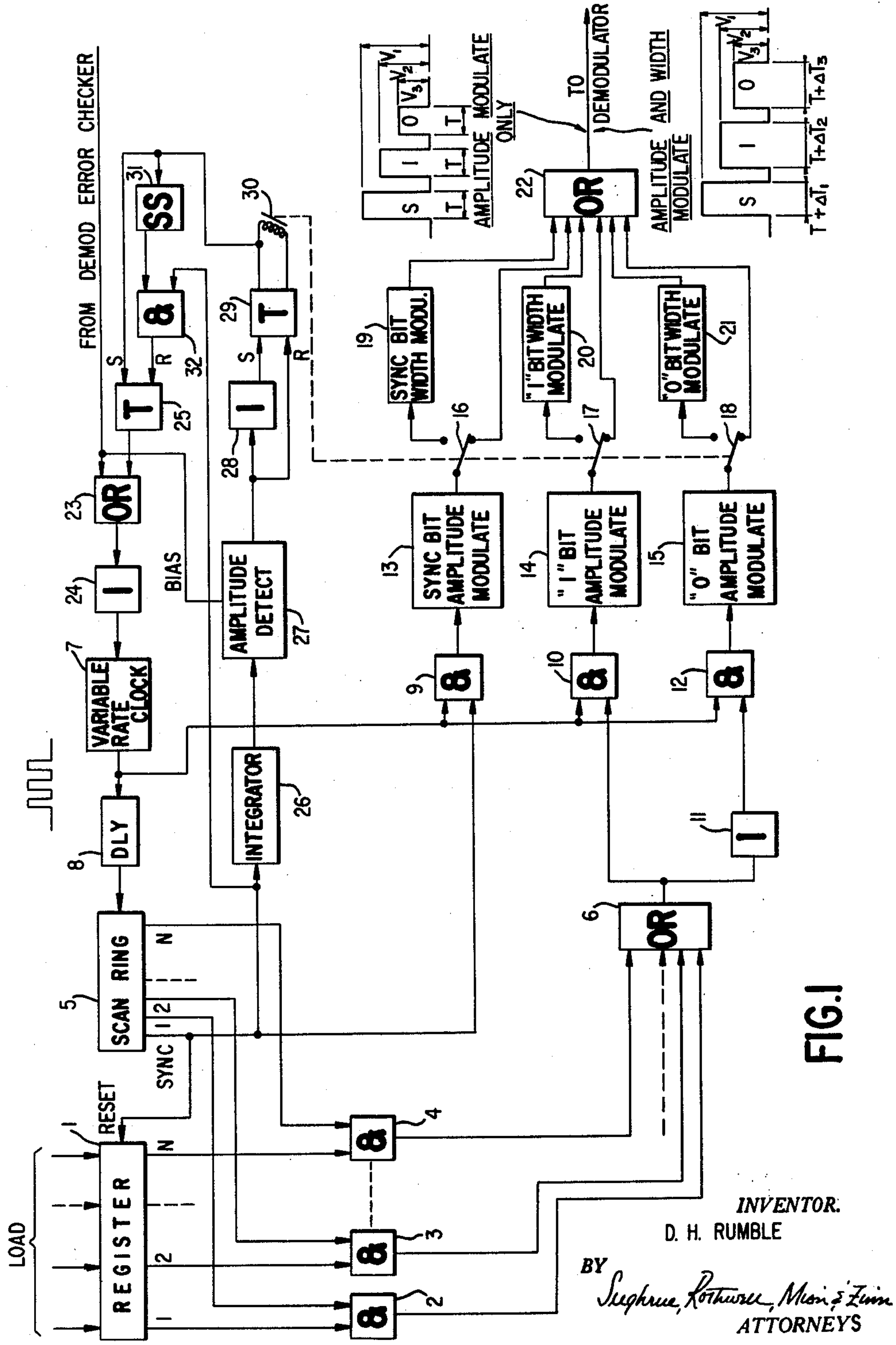

This disclosure relates to a pulse communication system, and more particularly, to one wherein amplitude modulated pulses represent information for a certain range of pulse repetition frequencies, while pulses which are both amplitude and width modulated represent information during a pulse repetition rate range lower than the first.

In any information transmission system, there is a trade-off relationship between modulation band width and bit rate for the signal to noise figure in said system. Thus, there is rendered more likely the possibility of recognizing noise for information unless the modulation band width is accordingly increased. Although a fairly high frequency rate for the transmission of information is most desirable in many situations, both from the standpoint of an improved signal to noise figure and faster communication, this may result in enhancement of wave distortion due to line capacitance and other such factors which will cause the loss of information to an unacceptable degree. These effects are especially serious where the information is represented by a combination of pulses having binary values of "1" or "0" according to the well known techniques used in the data processing and telegraphy arts. In such coding schemes, the loss of several binary bits in a message may result in complete unintelligibility of the information contained therein. On the other hand, a relatively high transmission rate of pulses increases the likelihood of mistaking noise spikes or the like for valid signals which consequently results in improper message combinations and thus loss of information.

In order to overcome the above problems inherent in the transmission of information, especially in pulse form, the present invention provides automatic means for converting a decrease in transmission bit rate into an increase of modulation band width thus allowing an improvement in the signal to noise ratio for the system. The principle here shown is applied to a binary coded N-channel asynchronous time system, but it is also applicable to many analogous forms of communication. Generally, the information is represented by pulse code data wherein at a certain higher frequency transmission rate, a binary "1" bit is represented by a pulse of amplitude $V_2$, while a "0" binary bit is represented by a pulse having a lesser amplitude of $V_3$. In this higher frequency range, both types of pulses have the same time width. A synchronizing pulse is periodically intermixed with the binary information pulses having an amplitude $V_1$, which is higher than either of the foregoing information bit pulses. Its width is the same as the information pulses. At a lower transmission rate range, however, information pulses are transmitted being both amplitude and width modulated by the same binary information. The synchronizing pulse is also width modulated in this lower range. The demodulating circuit, upon receiving a synchronizing pulse, determines its width and in accordance therewith, recognizes the binary information either by amplitude alone, or by both amplitude and width. This renders less likely the possibility of recognizing noise for information when the pulse repetition rate decreases. Automatic means are also provided with the complete communication system for lowering the transmission rate of the modulator in accordance with the error rate detection at the demodulator.

It is therefore an object of the present invention to provide an information transmission system wherein there may be modulation of either one or two parameters of a single pulse in order to represent the same information signal.

Another object of the present invention is to provide automatic means whereby the number of parameters of a single pulse which is modulated depends upon the pulse repetition rate.

A yet further object of the present invention is to provide means for detecting the same information content of pulses by demodulating either one or two parameters of a pulse.

Another object of the invention is to provide a communication system in which the number of parameters examined for demodulation of an information pulse depends upon the frequency rate of transmission.

Another object of the present invention is to provide a communication system in which a parameter of a synchronizing pulse intermixed with information pulses determines the type of demodulation to be performed on said information pulses.

A yet further object of the present invention is to provide a system for automatically adjusting the frequency rate of pulse transmission, together with varying its form of modulation, in accordance with the error rate detection at the demodulating circuit.

Figure 2:
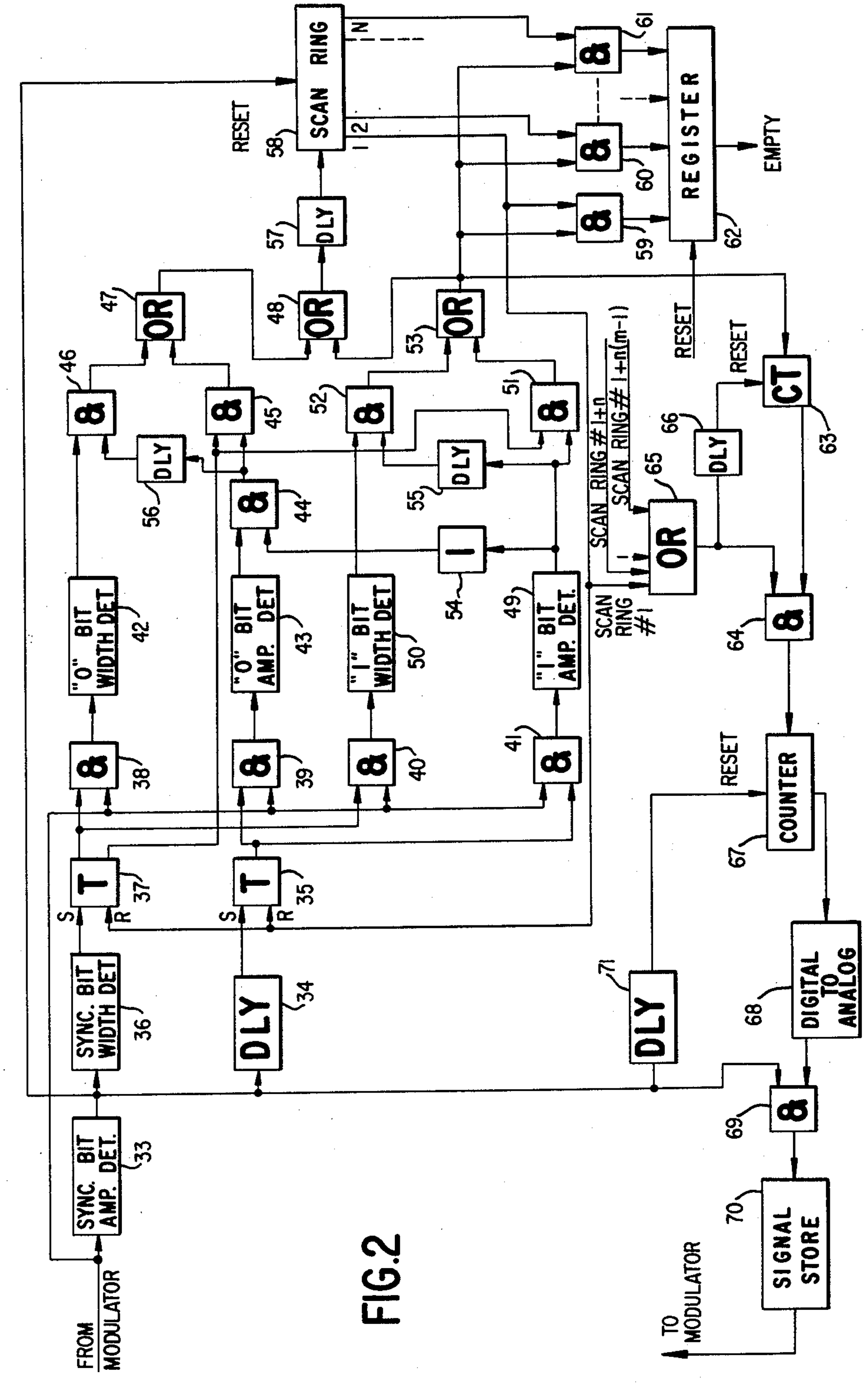

These and other objects of the present invention will be pointed out and become more apparent in the description to follow, which is to be taken in conjunction with the drawings, in which:

FIGURE 1 shows the logical block construction of the modulating circuit used in the present invention; and FIGURE 2 discloses the logical block construction of the demodulating circuit used in the present invention.

Referring first to FIGURE 1, the details of the modulator portion of the present invention will first be described. A multistage register 1 may be provided to store a message having N number of bits occurring between synchronizing pulses, of which one is generated prior to the transmission of any message. Register 1 may be loaded from any source, such as a multiplexer which is responsive to N number of information generating terminals, or the like. Since the present system is adapted to transmission of binary information, although the invention is not limited to this type, each stage of Register 1 may have two states which thus enables it to store either a binary "1" or a binary "0" bit in accordance with well known techniques. Outputs from each stage of Register 1 are applied to a series of sampling AND gates 2, 3, 4, where the number of sampling AND gates is equal to the number of N stages making up Register 1. The output lines from Register 1 which are applied to sampling AND gates 2 through 4 may, in this embodiment, be considered to have a raised potential in the event that a binary "1" bit is stored in the associated register stage. However, any signal notation may be employed for representing the binary information bits stored in Register 1.

A scan ring 5 is employed to successively and sequentially sample each of the gates 2 through 4 so as to pass a signal along their associated output lines to OR gate 6. Scan ring 5 may be any form of well known ring counter or the like which is stepped each time a pulse is received from a clock pulse generator 7. The first stage of scan ring 5, however, generates a sync pulse which is not applied to any of the sampling AND gates 2 through 4 associated with the output leads from Register 1. Only one stage in the scan ring 5 may be considered to be "on" at any particular time so that only one of the AND gates 2 through 4 is conditioned to pass a binary "1" contained in the associated stage of Register 1. In the event that a binary "1" is contained in the Register 1 stage being sampled by scan ring 5, an output appears from the associated AND gates 2 through 4 which is applied to OR gate 6. This causes the output of OR gate 6 to be raised for the entire time that scan ring 5 remains at its particular position. Then, upon receipt of the next pulse from clock 7, scan ring 5 steps to its next stage and so conditions the next one of AND gates 2 through 4 to pass a binary "1" if such is supplied to its input. The output from OR gate 6 thus consists of a series of pulses, each one representing a binary "1" bit. If a binary "0" resides in a stage of Register 1 being sampled, then no output is detected from OR gate 6 during the time that the scan ring 5 interrogates this stage. Upon scan ring 5 completing its scan by sampling the N stage of Register 1 with a signal from the scan ring N stage, the complete message held in Register 1 has been sampled and transmitted to the output of OR gate 6 in the form of a serial pulse train in which binary "1" bits are represented by the presence of pulses and binary "0" bits are represented by the absence of pulses. This scan ring now may come full circle so as to fire its initial sync 5 stage which, among other things, may reset Register 1 in order that it may be again loaded with a new message to be transmitted via sampling gates 2 through 4. The loading of Register 1 may be effected by any well known means.

The sync signal from scan ring 5 is applied to AND gate 9, while the direct output of OR gate 6 is applied to AND gate 10. The inverted output of OR gate 6, caused by the inclusion of inverter gate 11, is applied to AND gate 12. All three AND gates 9, 10, and 12 are sampled by the pulses emanating from clock 7. In order for an output pulse to appear from AND gate 9, it is thus necessary that the sync stage of scan ring 5 be fired at the time that a pulse appears from clock 7. In like manner, the output of OR gate 6 must be up so as to generate an output from AND gate 10 in the presence of a clock pulse. When the output from OR gate 6 is down, thus representing a binary "0" bit from Register 1, the output of inverter 11 will be up so that a pulse from clock 7 at this time will cause a pulse to be emitted from AND gate 12. Any pulses emanating from AND gates 9, 10 and 12 are of the same time width, which is approximately equal to the width of the pulses generated by clock 7.

Since the pulses in clock 7 are also used to step scan ring 5, a slight delay 8 may be necessary through which the clock pulses pass so that the information contained in a particular stage of register 1 may be sampled by each clock pulse at AND gates 10 and 12 before scan ring 5 is stepped by this pulse. It should be appreciated that the outputs appearing from AND gates 9, 10 and 12, respectively represent a sync pulse, a "1" bit, and a "0" bit. Thus, the absence of a pulse from OR gate 6, which represents a binary "0," has been translated into a pulse emanating from AND gate 12, while a "1" bit appearing from the output of OR gate 6 is generated as a pulse from AND gate 10.

The pulses generated by AND gates 9, 10 and 12 are respectively transmitted to three amplitude modulators 13, 14 and 15. The pulse from AND gate 9 when applied to amplitude modulator 13, is used to generate an output pulse having an amplitude $V_1$ with a width T such as indicated in the upper waveform appearing at the output of OR gate 22. In like fashion, a "1" bit pulse generated from AND gate 10 is applied to an amplitude modulator 14 so as to generate a pulse having amplitude $V_2$ with width T in the upper waveform. In the event that the switches 16, 17 and 18 rest in their lower position as shown, then any pulses generated by modulators 13, 14 and 15, are transferred via OR gate 22 to the output line leading to the demodulator. The amplitude modulators 13, 14 and 15 are not disclosed in detail, inasmuch as their functions may be performed by many well known circuits in the modulating art. For example, voltage clamp circuits having different biases may be used to modulate the output pulses appearing from AND gates 9, 10 and 12. These voltage clamps may adjust the magnitude of the output pulses from gates 9, 10 and 12 so as to generate pulses having the amplitudes shown in the upper waveform associated with the output of OR gate 22. Other well known circuits may also be used to perform this function.

In the event that switches 16, 17 and 18 are thrown to their upper position, the amplitude modulated pulses appearing from units 13, 14 and 15 are also modulated in width as shown in the lower waveform associated with the output or OR gate 22. For example, an amplitude modulated pulse from unit 13 representing a sync bit is applied to OR gate 22 via a width modulator 19 when switch 16 is in its upper position. Modulator 19 may lengthen the width T of the sync pulse by a fraction $\Delta T_1$. In like fashion, width modulator 20 may lengthen the pulse emanating from unit 14 by a fraction $\Delta T_2$, while width modulator 21 may lengthen the pulse from modulator 15 by the fraction $\Delta T_3$. The outputs from modulators 19, 20 and 21 are then applied to OR gate 22 for transmission to the demodulator. The lower waveform associated with the output of OR gate 22 therefore shows that the bit pulses representing information, as well as sync pulses, are both amplitude and width modulated by the same said information. The amplitude of each respective pulse remains the same as in the upper waveform, while their widths vary according to the increments $\Delta T_1$, $\Delta T_2$ and $\Delta T_3$. Thus, when switches 16, 17 and 18 are in the positions shown, the output pulses generated from OR gate 22 are modulated with respect to only their amplitude parameter. However, the transfer of switches 16, 17 and 18 to their upper positions causes the output pulses from OR gate 22 to be modulated in both their amplitude and width parameters.

The position of switches 16, 17 and 18 may be by operator choice, or may be made dependent upon the rate of information bit transmission from the modulator of FIGURE 1. This transmission rate is governed by the pulse rate of clock 7 which steps scan ring 5 in order to sequentially scan each stage in Register 1. In the transmission system shown, the ideal transmission rate is normally the highest possible consistent with the recovery of all or most of the information at the demodulator unit. In the demodulator, an error checker unit may be provided which determines the error rate occurring in any particular time or space unit. The output from this error checker may be returned to the modulator in FIGURE 1 to govern the bit transmission rate therefrom. OR gate 23 receives the error checker signal and passes it via inverter 24 to the variable rate clock 7. Clock 7 is constructed so as to vary its rate in accordance with the magnitude of its input signal. For example, such a clock may be a rotating magnetic drum having a clock pulse channel thereon, which is driven by a motor whose speed is directly proportional to its input signal. Another form of variable rate clock pulse generator might be a free-running multivibrator or blocking oscillator whose frequency is proportional to its plate voltage. In the presence of a relatively low output signal from OR gate 23, the input signal applied by inverter 24 to the clock 7 is relatively high, thus causing the bit transmission rate to be relatively high. Conversely, a relatively high output from OR gate 23 reduces the clock pulse rate from 7 because of the inversion function performed by unit 24.

As the signal from the demodulator error checker increases, thus indicating an increase in error rate, the bit transmission rate as governed by clock pulse generator 7 will proportionately decrease. The rate of sync pulse generation from scan ring 5 is also dependent upon the clock pulse output. Sync pulses are fed from the sync stage of scan ring 5 to an integrator 26 whose output is a function of the sync pulse generation rate. Integrator 26 may be any well known resistor-capacitor combination. The output from integrator 26 is applied to an amplitude detecting circuit 27, which may have either a fixed bias or one derived from the demodulator error checker. The function of amplitude detector 27 is to provide an output signal only when the integrator signal is greater than the bias signal applied thereto. Circuit 27 may be any one of well known types, such as a slicer in the electronic art. In the event that the bias voltage to detector circuit 27 is greater than the signal from integrator 26, no output will be generated from circuit 27. The output from amplitude detector 27 is applied to the set input of trigger 29 via an inverter 28, and directly to the reset terminal of trigger 29. When trigger 29 is in its reset condition, relay 30 will not be energized so that ganged switches 16, 17 and 18 rest in their lower position. However, when trigger 29 is placed in its set condition by a signal applied to its set input, relay 30 is energized so as to transfer switches 16, 17 and 18 to their upper contacts in order to both amplitude and width modulate the sync and information bit pulses being transmitted.

When an output appears from amplitude detector 27, trigger 29 is maintained in its reset condition because of the direct connection as shown in FIGURE 1. However, if the output from amplitude detector circuit 27 disappears, the inverted output from unit 28 results in trigger 29 being placed and maintained in a set position. As before mentioned, the relative magnitude of the integrator input as compared with the bias input to amplitude detector 27 determines its output condition. Thus, if the signal from the demodulator error checker is low, thus indicating little or no error, the pulse rate from clock 7 is relatively high so as to result in a high sync pulse repetition rate which in turn generates a relatively high output from integrator 26. In this condition, an output will appear from amplitude detector circuit 27 because the integrator input thereto is higher than its bias input. If the error rate increases in the demodulator, the signal appearing to OR gate 23 from the checker will increase, thus decreasing the clock pulse rate from clock 7 and also increasing the bias to amplitude detector 27. The decreased clock pulse rate from clock 7 will decrease the sync signal rate to integrator 26 and thus result in a lower average signal therefrom. The error rate may increase in the demodulator within a certain range without there being a change in the state of trigger 29. However, upon reaching any predetermined magnitude, the bias from the error checker at amplitude detector 27 will become greater than the output from integrator 26 so as to result in the absence of a signal from detector 27. This in turn will place trigger 29 in its set condition so as to energize relay 30 and place switches 16, 17 and 18 in their upper position. This results in the amplitude modulated pulses from 13, 14 and 15 being also modulated with respect to their width, as previously described.

It can thus be appreciated how the reduction of bit repetition rate, as evidenced by the output from integrator 26, results in the modulation by the same binary information signal of two parameters of the output pulses from OR gate 22. The circuit may be designed so that a certain frequency range is traversed by the bit repetition rate before width modulation is effected. It also should be noted that the pulse repetition rate of transmission may be automatically affected by the rate of errors detected at the modulator. However, once trigger 29 is placed in its set condition so as to perform double modulation, it is desirable that it maintain this position for a certain period of time even though the error rate from the demodulator is reduced because of the lower transmission frequency. This feature will reduce undesirable hunting of the system between its two modes of operation. The error rate normally will be reduced because of the lower transmission frequency and because the signal to noise figure is maintained or even enhanced due to the increased modulation band width resulting from the modulation of two parameters of the transmitted pulses. This operation is effected by means of a trigger 25 placed in its set condition at the time that relay 30 is energized by trigger 29. Trigger 25 in its set condition applied a relatively high signal to OR gate 23 so as to override any subsequent lower signal from the demodulator error checker, and thus maintain a low signal from the output of integrator 24 to the variable rate clock 7. The output signal from trigger 25 should be made high enough so as to result in the output from integrator 26 being lower than the lowest possible bias obtained from the demodulated error checker. This in turn will prevent an output from appearing from amplitude detector 27, which will thereby maintain trigger 29 in its set condition. Thus, even though the error rate at the demodulator diminishes to its lowest possible figure when double modulation occurs, the signal derived from the error checker will still be greater than the output signal from integrator 26, so as to maintain trigger 29 in such a state as to maintain the double modulation.

At the same time that trigger 25 is placed in its set condition, a delay circuit 31 may be energized to govern the time during which double modulation of output pulses will be maintained. For example, circuit 31 may be a single shot having an output therefrom only when in its stable state. Upon being set to its unstable state at the time that relay 30 is energized, no output will be applied from single shot 31 to AND gate 32. However, upon single shot 31 timing out and returning to its stable state, AND gate 32 will be conditioned to pass the next following sync signal from scan ring 5 so as to reset trigger 25. The resetting of trigger 25 will in turn make the output from OR gate 23 dependent upon the magnitude of the signal from the demodulator error checker. If the modulator error checker signal is low at the time that trigger 25 is reset, the scanning ring 5 frequency will be increased due to the increased pulse from clock 7. This in turn will raise the output of integrator 26 which will become greater than the bias supplied to amplitude detector 27. Therefore, output signal is generated from amplitude detector 27 resets trigger 29 and cause switches 16, 17 and 18 to return to their lower position so as to terminate the modulation of pulse width previously performed. The delay occasioned by single shot 31 may be made adjustable so that it will cover the span of as many message times desired. If delay 31 were not inserted, then it is probable that trigger 29 would hunt between its two positions at a fast rate with resulting detriment to the transmitted signal. By preventing the resetting of trigger 25 for a number of message periods, as determined by the repetition rate of sync signals from scan ring 5, any transmission line fault which resulted in a high error rate during high frequency transmission, may have time to clear so that the subsequent renewal of a high transmission rate with only amplitude modulation results in a relatively low error rate at the demodulator. As noted previously, the output from trigger 25 in its set condition is great enough so as to insure that the output from integrator 26 will always be lower than the lowest bias rate obtainable from the error checking at amplitude detector 27, which in turn insures that trigger 29 is maintained in its set condition.

Reference will now be made to FIGURE 2 showing the details of the demodulator circuit which may be used in conjunction with the modulator of FIGURE 1. The transmitted serial train of pulses from the modulator is applied to a sync bit amplitude detector 33 in the demodulator circuit. Detector 33 recognizes only sync pulses having an amplitude $V_1$. To illustrate this operation, only pulses having an amplitude greater than $V_1$ (waveforms in FIGURE 1) may pass through detector 33, which may have a structure similar to the amplitude detector 27 in FIGURE 1. Its bias is permanently set.

When a sync pulse is detected by unit 33 of the demodulator, the output pulse therefrom may pass through a short delay 34 so as to place trigger 35 in its set condition. The output from detector 33 is also transmitted to a sync bit width detector 36 which generates a pulse only if the sync bit has a width $T+\Delta T_1$ shown in the lower waveform of FIGURE 1. When only the amplitude of the sync pulses is modulated, the sync bit width detector 36 will not generate an output pulse inasmuch as the sync bit width is limited to T seconds. In this event, trigger 37 remains in its reset condition which thus indicates to the remaining modulator circuits that only the amplitude of the information pulses following a sync pulse need be considered in order to determine their information content. However, in the event that the sync pulse width has been modulated so that it is equal to $T+\Delta T_1$, a pulse is generated by detector 36 to set trigger 37, while trigger 35 will be set by the pulse emanating from the amplitude detector 33. Any well known width detector, such as Model MR–PWD made by Mim-Pad, Inc. of Hollywood, California, may be used.

The set outputs from trigger 35 are applied to condition AND gates 39 and 41 to which are also applied all pulses appearing from the modulator. In like fashion, the set output from trigger 37 is applied to condition AND gates 38 and 40 which also scan each pulse from the modulator. Associated with the outputs of AND gates 38 and 39 are the "0" bit width detector 42 and the "0" bit amplitude detector 43, respectively. When trigger 35 has been set by detection of a sync pulse via detector 33, AND gate 39 may pass all information pulses, excluding the sync pulse, to the "0" bit amplitude detector 43. Because of the delay 34 inserted between detector 33 and trigger 35, the sync pulse has disappeared from the input of AND gate 39 by the time that trigger 35 is set thereby. All information pulses having an amplitude $V_3$ or greater will cause the generation of a like number of output pulses from amplitude detector 43 whose bias is set accordingly. Thus, each "0" bit appearing from the modulator will be gated by AND gate 39 and sampled by detector 43 so as to generate an output to AND gate 44. The "1" bit amplitude detector 49 has a bias set so as to generate an output in response to all information pulses having an amplitude $V_2$ or greater, which represent a "1" binary bit. It will again be noted that no sync pulses having amplitude $V_1$ or greater may be applied to either detector 43 or detector 49, inasmuch as trigger 35 is set subsequent to the disappearance of said sync pulse at the inputs of AND gates 39 and 41. An output from amplitude detector 49 is applied to AND gate 51 and is also applied to AND gate 44 via the inverter 54. Thus, although "0" bit amplitude detector 43 will generate a pulse upon detecting a "1" information bit, the output from amplitude detector 49 at the same time will inhibit this pulse at AND gate 44. Only pulses representing valid "0" bits are applied to one input of AND gate 45, while those pulses representing valid "1" bits are applied to AND gate 51. It should be noted that if any of the information bit pulses appearing from the modulator have an amplitude less than $V_3$ (amplitude of valid "0" pulses), neither detector 43 nor 49 will generate pulses.

When only amplitude modulation is performed in the circuit of FIGURE 1, the demodulator need only examine the amplitude of the information pulses to determine their content and validity. Thus, trigger 37 will remain in its reset condition so as to condition AND gates 45 and 51 to pass pulses appearing respectively from AND gate 44 and detector 49, which represent the "0" bits and "1" bits of the information train. The output from AND gate 45 is passed via OR gate 47 to the input of OR gate 48. In like fashion, the output from AND gate 51 is passed via OR gate 53 to the input of OR gate 48. Since a "1" and a "0" bit cannot both appear simultaneously from the outputs of OR gates 53 and 47, there will be no coincidence of pulses at OR gate 48. Thus, for each information bit, whether it be a "0" or a "1," an output pulse appears at OR gate 48.

A register 62 is provided to have its stages loaded in succession so as to represent either binary "1" or binary "0" information. Each pulse appearing from OR gate 53 represents a binary "1" bit which may be applied in parallel to sampling AND gates 59, 60 and 61, with the other AND gates necessary for an N bit message not being shown. A scan ring 58 is provided which is stepped each time that a pulse appears from OR gate 48 via a slight delay 57. Only one stage of scan ring 58 may be "on" at any time which in turn conditions only one of the AND gates 59, 60 and 61 to pass a pulse appearing from OR gate 53. Assuming that scan ring 58 is reset by each sync pulse appearing from the modulator, it will be seen that if the first pulse following such a sync pulse is a binary "1," then an output will be generated from both OR gates 53 and 48. The output from OR gate 53 may pass through AND gate 59 which is conditioned by the set stage 1 of scan ring 58. Thus, the appropriate first stage of register 62 may be set to indicate a binary "1." A pulse from OR gate 58 is delayed slightly so that the corresponding pulse from OR gate 53 may be passed through AND gate 59 before scan ring 58 is set to its second position. If the first information pulse following the synchronizing pulse were a "0" binary bit, then no pulse would be generated from OR gate 53. In such case, no output from AND gate 59 would be generated during the time that scan ring position 1 was fired. However, a pulse from OR gate 48 is generated at this time to subsequently step scan ring 58 to its number 2 position in preparation for entering a "1" bit in stage 2 of register 62 if such appears from OR gate 53. The operation of scan ring 58 continues as described until the last position N is set "on." This is "on" at the time that the last information bit in the message appears from the modulator in order that the last stage of register 62 may have the binary information placed therein. This last information bit is generated from OR gate 48, thereupon stepping scan ring 58 back to its number 1 position in preparation for the first information bit of the next following message. It should be noted that sync pulses from the modulator do not advance scan ring 58 or affect OR gates 45 or 53, so that the timing of the ring need not take into consideration these particular pulses. Register 62 may be a buffer register which is emptied and reset by circuitry not shown upon being filled with a complete message.

In the event that double modulation is performed on the pulses generated from the modulator, the operation above described is altered as follows. In such case, trigger 37 is set on by an output from sync bit width detector 36 in response to a sync bit width of $T+\Delta T_1$. The set condition of trigger 37 prevents the conditioning of AND gates 45 and 51 so that outputs from amplitude detectors 43 and 49 cannot pass therethrough. Instead, the modulator must now examine both the width and amplitude of the information pulses in order to determine if they are valid signals. Trigger 37 in its set condition allows AND gates 38 and 40 to pass information pulses to the "0" bit width detector 42 and "1" bit width detector 50, respectively. These detectors examine each information pulse just as the amplitude detectors 43 and 49 examine each such pulse. "0" bit width detector 42 generates a pulse only if an input is applied thereto having a width $T+\Delta T_3$, which is the width of a modulated "0" bit pulse shown in the lower waveform of FIGURE 1. In like fashion, the "1" bit width detector 50 generates a pulse only in response to information pulse having a width $T+\Delta T_2$, which is the width of a "1" bit pulse shown in FIGURE 1. The outputs of detectors 42 and 50 are respectively applied to AND gates 46 and 52. The other input to AND gate 46 is derived from AND gate 44 via delay 56. Thus, AND gate 46 will only generate an output pulse if both detectors 42 and 43 are activated. Delay 56 insures that the output from detector 43 will still be present at the input of AND gate 46 by the time that width detector 42 has finished its sampling, which is only over at the conclusion of the "0" bit information pulse. In like fashion, AND gate 52 can only generate an output pulse in response to pulses from width detector 50 and amplitude detector 49. The outputs of AND gates 46 and 52 are applied to OR gates 47 and 53, respectively. The operation of the scan ring 58 and register 62 is as above described. Thus, it should be noted that when double modulation is performed in the modulator, a "0" bit information pulse or a "1" bit information pulse will not be passed to OR gates 47 or 53, respectively, unless each possesses the requisite amplitude and width as determined by the amplitude and width detectors in the demodulator.

As before noted, the frequency rate of bit transmission in the modulator may be automatically adjusted by the output of an error rate checker in the demodulator. This error rate checker may take any of the well known forms, only one of which is shown in FIGURE 2. It may be assumed in the present embodiment that the N bit message contained in register 1 of FIGURE 1 is comprised of *m* characters each having 6 information bits and a 7th parity bit. In data processing and transmission circuits, a parity bit associated with a character may be used to indicate the even or odd quality of the sum of the "1" bits, modulo 2, comprising said character. For example, in many parity systems, the binary sum (mod 2) of the "1" bits in the character, including the parity bit, is always equal to "0." Another way of stating this is that each character, including its parity bits, is comprised of an even number of "1" information bits. Therefore, if a single "1" bit in the character is dropped or added during transmission procedure, then the number of "1" bits contained in the character, including the parity bit, will be an uneven number which indicates an error. Normally, a "1" parity bit is generated when the information bits in a character are uneven so as to bring the total number of "1" bits in the character to an even number. Thus, it may here be assumed that the register 1 is filled with generated parity bits associated with each of the *m* characters held therein which comprise the message. It may also be assumed that each of the characters is comprised of *n* bits including the parity bits.

In the demodulator circuit, a complementing trigger 63 is made responsive to the "1" information bits generated by OR gate 53 so as to count and indicate the evenness or oddness of said "1" bits in the character. A complementing trigger is one which changes its state in response to each input pulse applied thereto. Such triggers are well known in the art. Complementing trigger 63 may be reset to its first state at the beginning of each of the characters comprising the message. This may be performed by OR gate 65 which is supplied with inputs from certain of the stages of scan ring 58 according to the number of binary bits comprising each message character. For example, scan ring position 1 will reset complementing trigger 63 to its first state. Thereupon, each successive "1" bit from OR gate 53 will cause trigger 63 to reverse its state. Scan ring 58 is set by each pulse appearing from OR gate 48 which thus causes scan ring 58 to effectively count the number of bits in the message. Thus, when scan ring position $1+n$ is reached, this indicates that the first character of the message has been placed into the register 62. At this time then, the output from trigger 63 may be sampled by means of AND gate 64. If an error has occurred to that an odd number of "1" bits has been counted by trigger 63 in this first character, including the parity bit, trigger 63 will be set to its "on" condition, thus raising its input to AND gate 64 and causing an output to be generated therefrom indicating that an error has been detected in the first message character. This pulse from AND gate 64 may be supplied to a counter 67 which will count the number of errors occurring during a particular interval of time. The output from OR gate 65 will also subsequently reset trigger 63 in order to prepare it for counting the number of "1" bits in the second character. Each time that a single error occurs in a character, a count will be supplied to counter 67, which thus measures the error rate. In order to generate an analog signal for use in the modulator circuitry, a digital-to-analog converter 68 may be supplied for the count in counter 67 so as to generate an analog signal therefrom. This signal may be applied to AND gate 69 which in turn is conditioned to pass said signal by each sync pulse detected at detector 33. When the sync pulse arrives at AND gate 69, the signal from the digital-to-analog converter 68 may be passed to some form of signal store unit 70 which will store the signal and apply it to the modulator. The same sync signal is then applied through a slight delay 71 so as to reset counter 67 in preparation for counting the number of errors appearing in the message to follow. At the conclusion of this message, another sync pulse will arrive preceding a third message in order to transfer the count in counter 67 to the signal store 70. In this manner, an increased error rate in succeeding messages will result in successive higher outputs from the signal store unit 70 which in turn will reduce the frequency transmission rate in FIGURE 1 as previously described. Conversely, if the error rate in successive messages is reduced, then the signal from store 70 will be successively reduced each time that the digital-to-analog unit 68 is sampled so that the frequency rate of transmission will increase. Counter 67 may alternatively be reset and digital-to-analog unit 68 sampled at time intervals shorter than message times, by causing the output from OR gate 65 to be applied to AND gate 69 and counter 67 in place of the sync pulse. This would result in possibly increasing signal from store 70 during the course of a message instead of in incremental jumps at the end of each message.

The error rate detector shown in FIGURE 2 does not constitute a portion of this invention, but is merely included in order to indicate how an automatic control of the frequency rate and modulation parameters may be accomplished by means of error rate detection in the demodulator. Any other error rate detector, operating upon any desired criteria, may be utilized in order to perform this automatic feedback control. Also, this invention contemplates that no feedback control from the error detector need be included, but that the determination of a change in modulation parameters may be performed at operator discretion, or by other automatic circuits.

While a preferred embodiment of the invention has been shown and described, modifications and alterations may be made thereto by those skilled in the art without departing from the spirit of the invention as defined in the appended claims.

What is claimed is:

1. A pulse communication system in which the same information may be selectively represented by one or a plurality of pulse parameters, in response to different conditions of the system, comprising, in combination: means for establishing a given number of information representing bits, means for generating a similar number of pulses including primary modulating means responsive to all of said bits for modulating the pulses to represent information by variations thereof in respect to a first parameter; supplementary modulating means responsive to the same bits for modulating the pulses additionally in respect to a second parameter thereof; means responsive to the different conditions of the system for selectively enabling or disabling said supplementary modulating means; means for receiving the pulses generated by said pulse generating means for retrieving therefrom the information represented in all of said information representing bits, said last named means being controllable to operate in a first mode of operation, so as to be responsive only to variations of the pulses in respect to said first parameter, when said supplementary modulating means is disabled, and being further controllable to operate in a second mode of operation, so as to be responsive to variations of the pulses in respect to both said first and said second parameters, when said supplementary modulating means is enabled; and means responsive to the different conditions of the system for selectively controlling the operation of said receiving means in said first mode of operation or said second mode of operation.

2. A system according to claim 1 in which said first pulse parameter is amplitude and said second pulse parameter is width.

3. A system according to claim 1 in which said first and second system conditions are respectively higher and lower pulse transmission rates.

4. A system according to claim 3 in which said first pulse parameter is amplitude and said second pulse parameter is width.

5. A system according to claim 1 and means for generating synchronizing pulses, means for interspersing said synchronizing pulses with said pulses containing information, means responsive to said first system condition for setting a parameter of each synchronizing pulse to a first value, and means responsive to said second system condition for setting said parameter of each synchronizing pulse to a second value.

6. A system according to claim 5 in which said receiving means is set to its first mode of operation in response to said first value of said synchronizing pulse parameter, and is set to its second mode of operation in response to said second value of said synchronizing pulse parameter.

7. A system according to claim 6 in which said synchronizing pulse parameter is the same as one of said information pulse parameters.

8. A system according to claim 6 in which said synchronizing pulse parameter is width, said information pulse first parameter is amplitude, and said information pulse second parameter is width.

9. A system according to claim 6 in which said first and second system conditions are respectively higher and lower pulse transmission rates.

10. A system according to claim 9 in which the said information carried by each pulse is a binary bit.

11. A pulse communication system in which the same information may be selectively represented by one or more pulse parameters, comprising in combination: first means for varying the pulse rate transmission, second means responsive to a first pulse rate value for operating in a first mode and generating synchronizing pulses having a first parameter value together with pulses each containing information represented by a first parameter thereof, said second means also responsive to a second pulse rate value lower than the first for operating in a second mode and generating synchronizing pulses having a second parameter value together with pulses each containing information duplicated by said first parameter and a second parameter thereof, third means receiving said pulses generated by said second means for retrieving information therefrom, said third means responsive to said first parameter value of said synchronizing pulses for sampling only said first parameter information pulses, said third means also responsive to the second parameter value of said synchronizing pulses for sampling both said first and second parameters of said information pulses, and error detecting means responsive to said pulses generated by said second means for controlling said first means to vary said pulse rate.

12. A system according to claim 11 in which said second means includes means for comparing said pulse transmission rate with said error detecting means in order to set said second means to its second mode of operation, together with delay means for subsequently resetting said second means to its first mode of operation.

13. A system according to claim 12 in which said first information pulse parameter is amplitude, and said second information pulse parameter is width.

14. A system according to claim 13 in which the said information carried by each pulse is a binary bit.

15. A pulse generating combination comprising: means for generating information pulses, means for varying the pulse generation rate, means responsive to a first pulse rate value for modulating said information pulses so that said pulses contain information represented by a first parameter, means responsive to a second pulse rate value lower than the first for generating pulses each modulated in accordance with said parameter and a second parameter.

16. A combination according to claim 15 in which said first parameter is amplitude and said second parameter is width.

17. A pulse demodulation circuit acting to extract information from pulses having one or more modulated parameters, comprising: first means for examining only a first parameter of said pulses, second means for examining only a second parameter of said pulses, third means responsive to a first signal for conditioning only said first means, said third means being also responsive to a second signal for conditioning both said first and second means, and fourth means responsive to said second signal and to the presence of signals from both said first and second means for generating the extracted information.

18. A circuit according to claim 17 which further includes means responsive to a synchronizing pulse parameter for generating said first and second signals.

References Cited in the file of this patent

UNITED STATES PATENTS 2,662,116 Potier ------------------ Dec. 8, 1953